United States Patent Office 2,723,255
Patented Nov. 8, 1955

2,723,255

ESTER DERIVATIVES OF CHLOROSULFONATED HYDROCARBON POLYMERS

Warren F. Busse and Malcolm A. Smook, Wilmington, Del., assignors to E. I. du Pont de Nemours and Company, Wilmington, Del., a corporation of Delaware No Drawing. Application December 23, 1952, Serial No. 327,665

17 Claims. (Cl. 260—79.3)

This invention relates to derivatives of the chlorosulfonated hydrocarbon polymers and more particularly to certain chlorosulfonated solid polymers of ethylene which have properties that particularly fit them for use as synthetic elastomers.

Many "rubber" substances are known, including the natural occurring substance called "caoutchouc" and the synthetic or substitute rubber substances, such as the butadiene-containing polymers and the olefin polymers generally which have been prepared by emulsion polymerization at elevated and so called "low" temperatures with Friedel-Crafts and redox type catalysts. More recently a tougher elastomer, highly resistant to abrasion, has been developed from substituted products produced by the process of McQueen U. S. Patent 2,212,786 of August 27, 1940. In accordance with the process of that patent chlorine and sulfur dioxide are reacted with olefin polymers to give substituted polymers containing sulfonyl chloride groups. The invention of the instant case is directed to the preparation of elastomers from derivatives of the chlorosulfonated hydrocarbon polymers and to derivatives of equivalent polymers that may be produced by any suitable process.

An object of the present invention is to provide new compositions of matter. Another object is to provide a process for the preparation of esters of the chlorosulfonated polymers of ethylene. Yet another object is to provide cured and uncured compositions of matter having elastomeric properties which constitute esters of the chlorosulfonated solid polymers of ethylene having definite compositions. Other objects and advantages of the invention will hereinafter appear.

The above and other objects of the invention are directed toward the preparation of derivatives of the chlorosulfonated hydrocarbon polymers that are formed in accord with this equation:

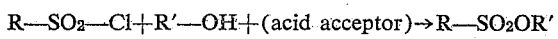

R—SO$_2$—Cl+R'—OH+(acid acceptor)→R—SO$_2$OR' in which R is a hydrocarbon polymer chain and more particularly a hydrocarbon polymer chain of a normally solid polymer of ethylene, preferably having a molecular weight of greater than 5000, and R' is an alkyl, aryl or aralkyl group. The acid acceptor may be any organic or inorganic base that will give a basic dissociation constant $K_b$ of greater than $2 \times 10^{-9}$.

Any suitable process may be used for preparing the chlorosulfonated hydrocarbon polymers or the chlorosulfonated normally solid polymers of ethylene or an equivalent hydrocarbon compound designated as R in the above formula. In accord with the preferred embodiment of the invention and in order to produce the superior elastomeric products of the invention, the chlorosulfonation reaction is conducted in order to provide a chlorosulfonated polymer having from 25 to 37% chlorine and 0.4 to 3% sulfur. Suitable processes for carrying out this reaction to produce polymers having the preferred range of chlorine and sulfur content may be conducted in accord with Examples 1 to 3.

Example 1.—A solution containing 25 parts ethylene polymer, which has a molecular weight of 20,000–25,000, and 670 parts carbon tetrachloride is stirred rapidly at the boiling point of the solvent while 24.9 parts chlorine and 6.7 parts sulfur dioxide are bubbled into the mixture. A type H$_4$ mercury vapor lamp is used to irradiate the reactants. After 21 minutes, during which time the temperature is allowed to drop to 40° C., the reaction is complete. Removal of the solvent is accomplished by steam distillation, following which the rubbery residue is washed with water to remove water-soluble acids. The polymer, after drying, contained 27.6% chlorine and 2.76% sulfur.

Example 2.—One hundred twenty-five grams of a chlorosulfonated polymer of ethylene having a chlorine content of 34.9% and a sulfur content of 0.4% is dissolved in 2.5 liters of carbon tetrachloride, and the mixture is heated with 50 grams of SO$_2$Cl$_2$ for 120 minutes at 76° C. The product is freed of solvent and soluble acid by the action of steam, and the resulting rubber-like resin is dried on a rubber mill. It has a chlorine content of 34.0% and a sulfur content of 0.72%.

Example 3.—Twenty-five parts of an ethylene polymer having a molecular weight of 12,000–15,000 is dissolved in 800 parts of carbon tetrachloride in a Pyrex vessel at 77° C. To the solution is added 15 grams sulfuryl chloride (i. e., sulfuric oxychloride), and the mixture is stirred rapidly while being irradiated by means of a 300-watt tungsten filament incandescent lamp. Under these reaction conditions 30 grams of chlorine and 13 grams of sulfur dioxide are introduced over a period of one hour. The resinous product is then precipitated by adding a large excess of methanol, and the precipitate is washed several times with methanol. Finally the product is freed of volatile matter by drying in a vacuum oven at 50° C. This gives a rather stiff rubbery resin which contains 37.3% chlorine and 1.0% sulfur.

Esters are produced from the products such as are described above in Examples 1, 2 and 3, or equivalent products, by reacting them in the presence of an acid acceptor with a hydroxyl containing compound which is mono or polyhydric. This reaction may, if desired, be carried out prior to separating the chlorosulfonated polymer from the reaction mixture as produced, for example, in accord with Examples 1 to 3 inclusive or, contrariwise, after separating the chlorosulfonated polymers from the reactants. Care should be exercised that the reaction be conducted under substantially anhydrous conditions for in the presence of water there is a tendency to produce the salt rather than the ester. The hydroxyl-containing compound is preferably first added to a solution in a suitable solvent of the chlorosulfonated polymer and after the mixture has been made uniform the acid acceptor is added.

The esterification feature of the process is conducted preferably in accord with the process of Examples 4 to 7.

Example 4.—One hundred ten parts of a chlorosulfonated ethylene polymer having a molecular weight of about 20,000, a chlorine content of 27% and a sulfur content of 1.7% is dissolved in 1100 parts of toluene in a Pyrex glass vessel and the water distilled from the solution as the toluene-water azeotrope to give a substantially anhydrous solution of the polymer in toluene. To the solution at 20° C. is added 35 parts of 100% ethanol and the mixture stirred rapidly until the solution is homogeneous. Then 16.8 parts (about 3 equivalents based on SO$_2$Cl content) of triethyl amine (dried over barium oxide) is added; the mixture is stirred to uniformity and allowed to stand overnight. Crystals of triethylamine hydrochloride precipitate but are not separated from the solution. The rubbery product is precipitated from solution by adding a large excess of methanol. The precipitate was washed several times with methanol to remove excess toluene and residual triethylamine hydrochloride. Finally the product is freed from volatile matter by drying in a vacuum oven at 50° C. This gives a rather stiff, rubbery resin in which infra-red analysis shows all of the sulfonyl chloride groups to have been converted to ethyl sulfonate groups.

*Example 5.*—Twenty parts of 100% phenol is added to an anhydrous solution of 110 parts chlorosulfonated ethylene polymer (molecular weight about 20,000, chlorine content 27%, sulfur content 1.7%) in 1000 parts of carbon tetrachloride and the solution is stirred to uniformity. About 17 parts of triethyl amine is added, the mixture is stirred until homogeneous and then allowed to stand overnight at room temperature. The rubbery product is precipitated from solution by adding a large excess of methanol, and the precipitate is washed to remove salts, then dried to remove volatile matter. This gives a rather stiff, rubbery resin in which infra-red analysis shows all of the sulfonyl chloride groups to have been converted into sulfonic ester groups.

*Example 6.*—To 100 parts of a solution such as that obtained in Example 1 (before removal of solvent) is added 10 parts of ethylene glycol followed by 10 parts of n-butyl amine. The solution sets to a stiff, hard gel within one minute because of the ester type crosslinks formed by the glycol.

*Example 7.*—To 100 parts of a solution such as that obtained in Example 1 (before the removal of solvent) is added 10 parts of ethylene glycol followed by 10 parts of barium hydroxide. The solution sets to a hard gel within 10 minutes by the formation of ester type crosslinks.

The amount of acid acceptor used is preferably slightly in excess of the amount equivalent to the sulfonyl chloride groups present. When a weak acceptor is used (e. g. triethyl amine) more of it can be tolerated than when a strong acceptor is used because of the tendency of the latter to hydrolyze the ester. Strong acceptors, however, while they tend to hydrolyze the ester, nevertheless produce appreciable quantities of the ester even when such acceptors are present in large amounts.

The esterification reaction takes place at room temperature or below up to about 140° C. Temperatures below 140° C. are preferred because of the tendency for the esters formed to cure at higher temperatures. The minimum temperature is limited solely by the viscosity of the solution being used and the length of time one wishes to allow for the reaction.

The esters of Examples 4 to 7 inclusive are recovered from the reaction mixture by any suitable process. The ester is first precipitated by a non-solvent, the organic bases and salts removed by washing with the non-solvent for the polymer while the inorganic bases are filtered off before removal of the solvent. If desired separation may be conducted substantially in accord with that disclosed in the Ludlow U. S. Patent 2,592,814, issued April 15, 1952, wherein the chlorosulfonated polymer in solution is atomized into a fluid maintained at a temperature above the boiling point of the solvent.

In preparing the esters, alkyl, aryl or aralkyl mono or polyhydric alcohols may be used. For example, esters of these hydroxyl-containing compounds with the chlorosulfonated hydrocarbon polymers provide valuable compositions; methyl ethyl, iso and normal propyl and the higher straight and branched chain monohydric alcohols, benzyl alcohol, cresol and the higher molecular weight aromatic alcohols; cyclohexanol and other cyclic alcohols; the glycols, such as ethylene glycol, propylene glycol, diethylene glycol and the mono alkyl ethers thereof, e. g., the monomethyl or monoethyl and like ethers of the ethylene, propylene, diethylene and higher molecular weight polyhydric alcohols. Glycerol and its mono or dialkyl or aryl ethers can be employed. Other hydroxyl substituted compounds may be reacted with these chlorosulfonated hydrocarbon polymers such, for example, as hydroxyacetic, lactic, hydroacrylic acids and the like.

In addition to the solvents of the examples, other solvents of the chlorosulfonated polymers of ethylene may be used such as the halogenated hydrocarbons, for example carbon tetrachloride and chloroform as well as the liquid hydrocarbons such as benzene, xylene and the like.

The inorganic bases that may be employed include the alkali metal and alkaline earth metal and ammonium hydroxides and carbonates. Organic bases such as ammonia or the mono, di and triethyl amines and the like as well as the salts of strong bases and weak acids may be used for providing an acid acceptor in which to conduct the esterification.

The products separated from the reaction mixtures of Examples 4 to 7 and like processes can be used per se, in what may be called the uncured form, for uses in which synthetic elastomers are adaptable. These products, however, are capable of being cured to give elastomer products having properties in many instances superior to those of cured natural "rubber" and the cured synthetic "rubbers."

The esters of the chlorosulfonated hydrocarbon polymers may be converted to cross-linked compounds by this reaction:

$$RSO_3R' + XY + R'OSO_2R \rightarrow RSO_2-X-SO_2R + 2YR'$$

in which XY designates an organic or inorganic cross-linking agent. While the above equation illustrates but a single —SO₃R' group attached to the polymer chain R, it is to be understood that as the normally solid polymers have a molecular weight of 10,000 or more there are a plurality of the —SO₃R groups per molecule and a plurality of cross-linkages therefore per molecule. More specifically, the cross-linking reaction is illustrated by this equation:

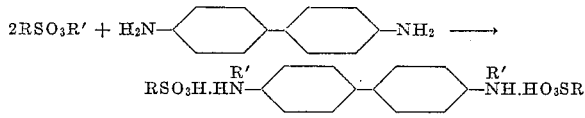

The curing of the esters of the application is best conducted after compounding the substituted polymer with a vulcanization mixture containing either an organic or inorganic cross-linking agent. Other curing aids may be added if desired to further improve the properties of the final cured or vulcanized product. After compounding the ester with the compounding agents, hereinafter described, which is preferably carried out on a rubber mill or similar apparatus for thoroughly mixing elastomeric substances, the compounded elastomer is subjected to heat and pressure to cure the resulting product fully. The curing temperature may range between 100 and 180° C. and pressures may be used if desired, ranging from 15 to 500 lbs./sq. in. or higher. Specific curing agents work best at definite temperatures within this range, e. g., litharge-Captax—150 to 170° C.; benzidine—100 to 170° C.. GMF—160 to 170° C. and litharge/GMF—150 to 170° C. The inorganic cross-linking agents that may be used include, for example, the polyvalent metal oxides and hydroxides generally. Magnesia is particularly good, but cures are also obtained with litharge, zinc oxide, red lead, barium oxide and the like.

In place of or together with the inorganic curing agents, organic curing agents may be used to cross-link the chlorosulfonated esters of the polymers. These include the dioximes, such as p-quinone dioxime and succinaldehyde dioxime and compounds containing more than one hydroxyl, mercapto, amino or amido radical. The diamines, such as benzidine, give particularly good properties.

Table I describes the properties of many cured esters of the chlorosulfonated polymer of ethylene and in some cases compares them with similarly cured non-esterified chlorosulfonated polymers of ethylene. The elastomers of the table were prepared as described above with the specific recipes designated in the table. The compounded elastomer was then formed by compression into a sheet, having the thickness indicated, and then treated for the time and temperatures therein shown. The physical properties of the compositions subsequent to curing are also tabulated to emphasize the outstanding properties of many of the cured esters of the chlorosulfonated hydrocarbon polymers.

metal, 2 to 60 parts; rosin, or equivalent, 0 to 30 parts; antioxidant, 0.0 to 10 parts; accelerator, 0 to 8 parts; inorganic fillers, organic fillers or reenforcing agents 0 to 500 parts, preferably 0 to 30 parts.

The products of the invention are useful in the preparation of elastomers, as coating compositions, for the water-proofing of textiles and many other applications in

*Table I*

| Recipe | 1 | 2 | 3 | 4 | 5 | 6 | 7 | 8 | 9 | 10 |
|---|---|---|---|---|---|---|---|---|---|---|
| S-2* (1.7% S-27.8% Cl) | 100 | | 100 | | 100 | | | | | 100 |
| S-2* Ethyl Ester (1.7% S-26% Cl) | | 100 | | 100 | | 100 | 100 | 100 | 100 | |
| Staybelite [1] | | | 2.5 | 2.5 | 2.5 | 2.5 | 2.5 | 2.5 | 2.5 | |
| SRF Carbon Black | | | | | 40 | 40 | | | | 20 |
| Litharge | | | 40 | 40 | | | | | | 10 |
| Magnesia | | | | | | 20 | 20 | | 20 | 20 |
| Calcium Hydroxide | | | | | | | | 20 | | |
| Captax [2] | | | 1.5 | 1.5 | | | | | | |
| Tetrone A [3] | | | | | 1.0 | 1.0 | | 1.0 | | |
| GMF [4] | | | | | | | | | | 10 |
| Benzidine | | | | | | | | | | |
| Ethylene Diamine | | | | | | | | | | |
| Zenite Special [5] | | | | | | | | | | |
| NA-22 [6] | | | | | | | | | | |
| 2-Amino-2-Benzamide-thiazole | | | | | | | | | | |
| Dithiobiuret | | | | | | | | | | |
| Cure: | | | | | | | | | | |
|   Temperature (° C) | 100 | 100 | 160 | 160 | 160 | 160 | 160 | 160 | 160 | 160 |
|   Time (Minutes) | 10 | 10 | 30 | 30 | 30 | 30 | 30 | 30 | 30 | 30 |
|   Pressure (p. s. i.) | 500 | 500 | 550 | 550 | 550 | 550 | 550 | 550 | 550 | 550 |
|   Thickness (mils) | 75 | 75 | 75 | 75 | 75 | 75 | 75 | 75 | 75 | 75 |
| Tensile Properties: | | | | | | | | | | |
|   100% Modulus (p. s. i.) | 75 | 75 | 425 | 125 | 1,625 | 29.50 | | 600 | 500 | 1,735 |
|   Strength (p. s. i.) | 560 | 560 | 2,635 | 1,250 | 2,865 | 3,690 | 2,245 | 1,860 | 2,225 | 3,010 |
|   Elongation (percent) | 1,000 | 1,000 | 450 | 625 | 175 | 150 | 465 | 560 | 535 | 200 |
|   1 Minute Residual Elong. (percent) | 125 | 190 | 35 | 75 | 10 | 5 | 50 | 45 | 45 | 15 |
| Water Gain (7 days, 70° C.) (percent) | 14.6 | 57.5 | 1.46 | 25.4 | 38.2 | 19.2 | 43 | 21.6 | 15.3 | 11.5 |
| Mooney Viscosity | 30 | 30 | | | | | | | | |

| Recipe | 11 | 12 | 13 | 14 | 15 | 16 | 17 | 18 | 19 |
|---|---|---|---|---|---|---|---|---|---|
| S-2* (1.7% S-27.8% Cl) | | 100 | | | | | | | |
| S-2* Ethyl Ester (1.7% S-26% Cl) | 100 | | 100 | 100 | 100 | 100 | 100 | 100 | 100 |
| Staybelite [1] | | | | | | | | | |
| SRF Carbon Black | 20 | 20 | 20 | | | | | | |
| Litharge | 10 | | | | | | | | |
| Magnesia | | | | | | | | | |
| Calcium Hydroxide | | | | | | | | | |
| Captax [2] | | | | | | | | | |
| Tetrone A [3] | | | | | | | | | |
| GMF [4] | 10 | | | | | 5 | | | |
| Benzidine | | 15 | 15 | | | | | | |
| Ethylene Diamine | | | | 5 | | | | | |
| Zenite Special [5] | | | | | 15 | | | | |
| NA-22 [6] | | | | | | | 15 | | |
| 2-Amino-2-Benzamide-thiazole | | | | | | | | 5 | |
| Dithiobiuret | | | | | | | | | 15 |
| Cure: | | | | | | | | | |
|   Temperature (° C) | 160 | 160 | 160 | 160 | 160 | 160 | 160 | 160 | 160 |
|   Time (Minutes) | 30 | 30 | 30 | 30 | 30 | 30 | 30 | 30 | 30 |
|   Pressure (p. s. i.) | 550 | 550 | 550 | 550 | 550 | 550 | 550 | 550 | 550 |
|   Thickness (mils) | 75 | 75 | 75 | 40 | 40 | 40 | 40 | 40 | 40 |
| Tensile Properties: | | | | | | | | | |
|   100% Modulus (p. s. i.) | 360 | 1,460 | 1,940 | | | | | | |
|   Strength (p. s. i.) | 1,360 | 2,840 | 3,335 | 1,107 | 1,359 | 1,895 | 1,705 | 2,505 | 2,310 |
|   Elongation (percent) | 475 | 175 | 350 | 500 | 340 | 550 | 500 | 650 | 400 |
|   1 Minute Residual Elong. (percent) | 60 | 10 | 20 | 40 | 30 | 65 | 40 | 50 | 48 |
| Water Gain (7 days, 70° C.) (percent) | 5.9 | 4.1 | 13.7 | 116 | 160 | 31 | 178 | 72 | 250 |
| Mooney Viscosity | | | | | | | | | |

*S-2 is a code name for chlorosulfonated polyethylene.
[1] Staybelite—Hydrogenated rosin acid.
[2] Captax—2-mercaptobenzothiazole.
[3] Tetrone A—Dipentamethylene thiuram tetrasulfide.
[4] GMF—p-quinone dioxime.
[5] Zenite Special—Zinc salt of mercaptobenzothiazole.
[6] NA-22—2-mercaptoimidazoline.

In addition to the cross-linking agents, the compounded mixture may contain a weak monobasic or polybasic acid of high molecular weight, such as stearic acid or rosin. Small amounts of antioxidants and/or accelerators may also be used, such as diphenyl guanidine, mercaptobenzothiazole, tetramethyl thiuramdisulfide, phenyl beta naphthyl amine, or high molecular weight phenolic compounds. Fillers or reenforcing agents such as carbon black, barium sulfate, kaolin, diatomaceous earth, powdered talc, titanum dioxide, and calcium sulfate may be used. Sulfur may also be included in the vulcanization mix, but it is generally omitted since the vulcanization reaction takes place readily in the absence of free sulphur. The quantities of these agents which give best results are, per 100 parts of substituted polymer: oxide of di or polyvalent which elastomeric compounds are used which require excellent wear resistance.

While there are disclosed a limited number of embodiments of the process and products of the present invention, a multiplicity of other embodiments are included within the scope of the invention, the invention being limited only by the scope of the claims.

We claim:
1. The process for preparing an ester of a chlorosulfonated normally solid polymer of ethylene which consists essentially of adding to a solution of the polymer in an organic solvent a monohydric compound of the formula R'—OH wherein R' represents a hydrocarbon radical of the class consisting of alkyl, aryl and aralkyl radicals, stirring until the mixture is substantially homogeneous, then adding to such mixture a trialkyl amine which has a $K_b$ of at least $2 \times 10^{-9}$, stirring the resulting mixture until it is substantially homogeneous, such process being conducted under substantially anhydrous conditions at about atmospheric temperature, and subsequently recovering the ester from the reaction mixture.

2. The process for preparing an ester of a chlorosulfonated normally solid polymer of ethylene which consists essentially of adding to a solution of the polymer in an organic solvent a monohydric alcohol of the formula R'—OH wherein R' represents an alkyl radical, stirring until the mixture is substantially homogeneous, then adding to such mixture a trialkyl amine which has a $K_b$ of at least $2 \times 10^{-9}$, stirring the resulting mixture until it is substantially homogeneous, such process being conducted under substantially anhydrous conditions at about atmospheric temperature, and subsequently recovering the ester from the reaction mixture.

3. The presence for preparing an ester of a chlorosulfonated normally solid polymer of ethylene which consists essentially of adding to a solution of the polymer in an organic solvent ethanol, stirring until the mixture is substantially homogeneous, then adding to such mixture a trialkyl amine which has a $K_b$ of at least $2 \times 10^{-9}$, stirring the resulting mixture until it is substantially homogeneous, such process being conducted under substantially anhydrous conditions at about atmospheric temperature, and subsequently recovering the ester from the reaction mixture.

4. The process for preparing an ester of a chlorosulfonated normally solid polymer of ethylene which consists essentially of adding to a solution of the polymer in an organic solvent a monohydric phenol of the formula R'—OH wherein R' represents an aryl radical, stirring until the mixture is substantially homogeneous, then adding to such mixture a trialkyl amine which has a $K_b$ of at least $2 \times 10^{-9}$, stirring the resulting mixture until it is substantially homogeneous, such process being conducted under substantially anhydrous conditions at about atmospheric temperature, and subsequently recovering the ester from the reaction mixture.

5. The process for preparing an ester of a chlorosulfonated normally solid polymer of ethylene which consists essentially of adding to a solution of the polymer in an organic solvent phenol, stirring until the mixture is substantially homogeneous, then adding to such mixture a trialkyl amine which has a $K_b$ of at least $2 \times 10^{-9}$, stirring the resulting mixture until it is substantially homogeneous, such process being conducted under substantially anhydrous conditions at about atmospheric temperature, and subsequently recovering the ester from the reaction mixture.

6. The process for preparing an ester of a chlorosulfonated normally solid polymer of ethylene which consists essentially of adding to a solution of the polymer in an organic solvent a monohydric compound of the formula R'—OH wherein R' represents a hydrocarbon radical of the class consisting of alkyl, aryl and aralkyl radicals, stirring until the mixture is substantially homogeneous, then adding to such mixture triethyl amine, stirring the resulting mixture until it is substantially homogeneous, such process being conducted under substantially anhydrous conditions at about atmospheric temperature, and subsequently recovering the ester from the reaction mixture.

7. The process for preparing an ester of a chlorosulfonated normally solid polymer of ethylene which consists essentially of adding to a solution of the polymer in an organic solvent ethanol, stirring until the mixture is substantially homogeneous, then adding to such mixture triethyl amine, stirring the resulting mixture until it is substantially homogeneous, such process being conducted under substantially anhydrous conditions at about atmospheric temperature, and subsequently recovering the ester from the reaction mixture.

8. The process for preparing an ester of a chlorosulfonated normally solid polymer of ethylene which consists essentially of adding to a solution of the polymer in an organic solvent phenol, stirring until the mixture is substantially homogeneous, then adding to such mixture triethyl amine, stirring the resulting mixture until it is substantially homogeneous, such process being conducted under substantially anhydrous conditions at about atmospheric temperature, and subsequently recovering the ester from the reaction mixture.

9. An ester of a chlorosulfonated normally solid polymer of ethylene and a monohydric compound of the formula R'—OH wherein R' represents a hydrocarbon radical of the class consisting of alkyl, aryl and aralkyl radicals.

10. The ethyl ester of a chlorosulfonated normally solid polymer of ethylene.

11. The phenyl ester of a chlorosulfonated normally solid polymer of ethylene.

12. The process which comprises compounding an ester of a chlorosulfonated normally solid polymer of ethylene and a monohydric compound of the formula R'—OH wherein R' represents a hydrocarbon radical of the class consisting of alkyl, aryl and aralkyl radicals with an organic polyfunctional cross-linking agent of the class consisting of dioximes, diamines and diamides, and heating the compounded mixture under pressure to cure such mixture.

13. The process which comprises compounding the ethyl ester of a chlorosulfonated normally solid polymer of ethylene with an organic polyfunctional cross-linking agent of the class consisting of dioximes, diamines and diamides, and heating the compounded mixture under pressure to cure such mixture.

14. The process which comprises compounding an ester of a chlorosulfonated normally solid polymer of ethylene and a monohydric compound of the formula R'—OH wherein R' represents a hydrocarbon radical of the class consisting of alkyl, aryl and aralkyl radicals with a diamine, and heating the compounded mixture under pressure to cure such mixture.

15. The process which comprises compounding an ester of a chlorosulfonated normaly solid polymer of ethylene and a monohydric compound of the formula R'—OH wherein R' represents a hydrocarbon radical of the class consisting of alkyl, aryl and aralkyl radicals with benzidine, and heating the compounded mixture under pressure to cure such mixture.

16. The process which comprises compounding the ethyl ester of a chlorosulfonated normally solid polymer of ethylene with a diamine, and heating the compounded mixture under pressure to cure such mixture.

17. The process which comprises compounding the ethyl ester of a chlorosulfonated normally solid polymer of ethylene with benzidine, and heating the compounded mixture under pressure to cure such mixture.

References Cited in the file of this patent

UNITED STATES PATENTS

| | | |
|---|---|---|
| 2,212,786 | McQueen | Aug. 27, 1940 |
| 2,534,078 | Strain | Dec. 12, 1950 |
| 2,630,425 | Rodman | Mar. 3, 1953 |

OTHER REFERENCES

Whitmore: "Organic Chemistry," page 167 (Van Nostrand, 1937).